(12) United States Patent
Cook et al.

(10) Patent No.: US 8,844,882 B2
(45) Date of Patent: Sep. 30, 2014

(54) FASTENER ASSISTED HANGER

(75) Inventors: Vincent Cook, Milford, CT (US); Keith M. Lombardi, Avon, CT (US)

(73) Assignee: Stanley Black & Decker, Inc., New Britain, CT (US)

( * ) Notice: Subject to any disclaimer, the term of this patent is extended or adjusted under 35 U.S.C. 154(b) by 22 days.

(21) Appl. No.: 13/446,924

(22) Filed: Apr. 13, 2012

(65) Prior Publication Data

US 2013/0269162 A1 Oct. 17, 2013

(51) Int. Cl.
*F16L 3/08* (2006.01)

(52) U.S. Cl.
USPC ............. 248/74.2; 248/68.1; 174/156

(58) Field of Classification Search
USPC ........ 248/74.2, 74.1, 65, 74.5, 544, 546, 547, 248/68.1; 174/135, 156
See application file for complete search history.

(56) References Cited

U.S. PATENT DOCUMENTS

| | | | |
|---|---|---|---|
| 2,886,815 A | | 5/1959 | Young |
| 3,188,030 A | * | 6/1965 | Fischer .................... 248/68.1 |
| 3,491,972 A | | 1/1970 | Townshend |
| 4,655,423 A | * | 4/1987 | Schavilje et al. ............. 248/71 |
| 4,805,824 A | | 2/1989 | Erickson |
| 4,903,920 A | | 2/1990 | Merritt |
| 5,385,320 A | | 1/1995 | Ismert et al. |
| D402,540 S | | 12/1998 | Stridh |
| 6,666,415 B2 | | 12/2003 | Hansen |
| 6,889,944 B2 | | 5/2005 | Brandzel et al. |
| 7,622,682 B2 | * | 11/2009 | Malin ........................ 174/135 |
| 7,874,778 B1 | | 1/2011 | Derrig et al. |
| 2004/0099772 A1 | * | 5/2004 | Durig et al. ................ 248/68.1 |
| 2004/0262461 A1 | | 12/2004 | Del Re et al. |
| 2007/0180664 A1 | | 8/2007 | Perry |
| 2010/0090073 A1 | | 4/2010 | Mulch et al. |

FOREIGN PATENT DOCUMENTS

| | | |
|---|---|---|
| DE | 11125 | 2/1956 |
| DE | 946458 | 8/1956 |
| DE | 77 31 628 | 7/1978 |
| DE | 22 65 495 | 4/1980 |
| DE | 3213811.1 | 11/1982 |
| DE | 3624993 | 1/1988 |
| DE | 275 141 | 1/1990 |
| DE | 9107748.6 | 8/1991 |
| DE | 4130011.4 | 3/1993 |
| DE | 9403291.2 | 5/1994 |
| DE | 202005008898.6 | 9/2005 |
| EP | 0 421 055 | 4/1991 |
| EP | 0 582 200 | 2/1994 |
| EP | 0 702 181 | 3/1996 |

(Continued)

*Primary Examiner* — Anita M King
(74) *Attorney, Agent, or Firm* — Pillsbury Winthrop Shaw Pittman LLP

(57) ABSTRACT

A hanger configured to be mounted to a supporting surface includes a fastener receiving body configured to be positioned on the supporting surface. The hanger also includes a hook portion positioned adjacent to the fastener receiving body and configured to receive a retainable object therein. The hanger additionally includes a first datum surface associated with a first orientation direction of the fastener body. The hanger further includes a second datum surface associated with a second orientation direction of the fastener body. The relative positions of the first datum surface and the second datum surface are arranged such that when a fastener tool abuts the first datum surface and the second datum surface, a fastener applied by the fastener tool is positioned within a bounded area of the fastener receiving body.

15 Claims, 3 Drawing Sheets

(56) References Cited

FOREIGN PATENT DOCUMENTS

| EP | 0 935 722 | 8/1999 |
|----|-----------|--------|
| FR | 2 948 163 | 1/2011 |
| GB | 819357 | 9/1959 |
| GB | 1 391 809 | 4/1975 |
| GB | 2 100 333 | 12/1982 |
| GB | 2 383 693 | 7/2003 |
| WO | 2008/051952 | 5/2008 |
| WO | 2011/119970 | 9/2011 |

* cited by examiner

FASTENER ASSISTED HANGER

FIELD OF THE INVENTION

The present invention relates generally to management of elongate members such as but not limited to wires, cables, or vines.

BACKGROUND OF THE INVENTION

Elongate members such as wires, cables, or vines may generally be managed by hooking the elongate member with a body that is fastened to a support surface. Among other things, the present application relates to an improved body design configured for accurate fastening to the support surface.

SUMMARY OF THE INVENTION

According to one aspect of this disclosure a hanger configured to be mounted to a supporting surface includes a fastener receiving body configured to be positioned on the supporting surface. The hanger also includes a hook portion positioned adjacent to the fastener receiving body and configured to receive a retainable object therein. The hanger additionally includes a first datum surface associated with a first orientation direction of the fastener body. The hanger further includes a second datum surface associated with a second orientation direction of the fastener body. The relative positions of the first datum surface and the second datum surface are arranged such that when a fastener tool abuts the first datum surface and the second datum surface, a fastener applied by the fastener tool is positioned within a bounded area of the fastener receiving body.

According to another aspect of this disclosure, a method of retaining an retainable object includes providing a hanger comprising a fastener receiving body, a hook portion positioned adjacent to the fastener receiving body and configured to receive the retainable object therein; a first datum surface associated with a first orientation direction of the fastener body; and a second datum surface associated with a second orientation direction of the fastener body. The method also includes positioning the hanger such that the fastener receiving body is positioned on a support surface. The method additionally includes aligning a fastener tool against the first datum surface and the second datum surface. The method additionally includes operating the fastener tool to place a fastener within a bounded area of the fastener receiving body. The method further includes receiving the retainable object in the hook portion of the hanger.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not a limitation of the invention. In addition, it should be appreciated that structural features shown or described in any one embodiment herein can be used in other embodiments as well. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

Features of the tool in accordance with one embodiment are shown in the drawings, in which like reference numerals designate like elements. The drawings form part of this original disclosure in which.

DETAILED DESCRIPTION OF THE ILLUSTRATED EMBODIMENT(S)

Figure 1:
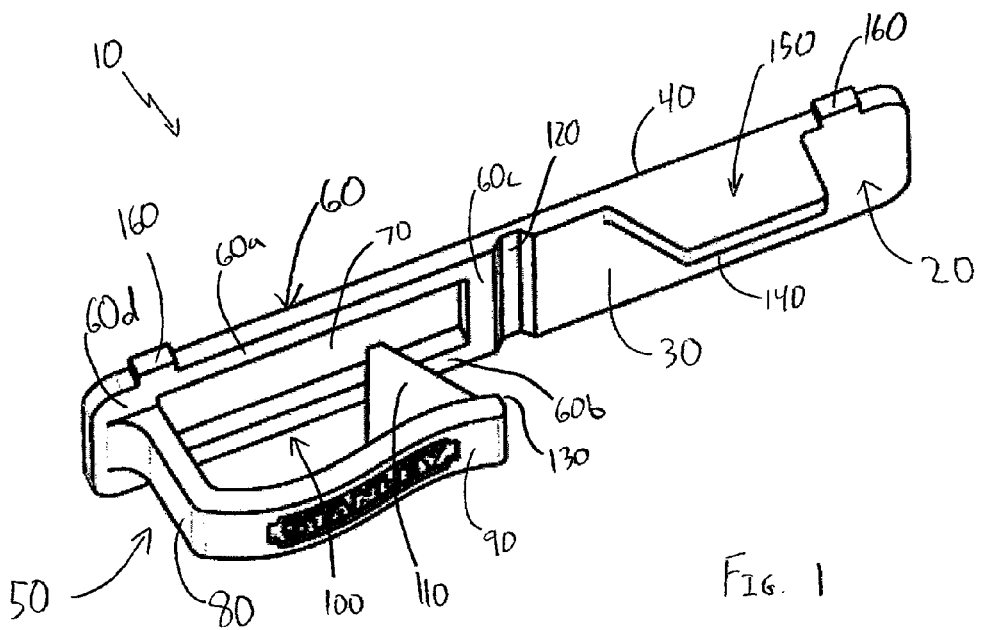
FIG. 1 is a perspective view of an embodiment of a fastener assisted hanger.

FIGS. 1 and 2A-D show an embodiment of a fastener assisted hanger 10 of the present invention. In particular, FIG. 1 illustrates a perspective view of the fastener assisted hanger 10, while FIGS. 2A-D illustrate top, left side, front, and right side views respectively. The fastener assisted hanger 10 may be formed from any appropriate material or materials, including but not limited to plastic, paper (including cardstock and cardboard), rubber, metal, and/or combinations thereof. While in the illustrated embodiment the fastener assisted hanger 10 is formed of a uniform material, it may be appreciated that in other embodiments the fastener assisted hanger 10 may be formed as an assembly of components. The fastener assisted hanger 10 or the components thereof may be formed by any appropriate construction, including but not limited to being molded, cut, carved, bent, extruded, die pressed, fused, welded, adhered through any suitable adhesive, snap fit together, interlocked, and combinations thereof. Additionally, various fasteners or engagements may be utilized in various embodiments to combine components into an assembly.

As shown in FIGS. 1 and 2A-D, the fastener assisted hanger 10 may include a fastener receiving body 20, configured to be secured to a support surface by a fastener. As described in greater detail below, the fastener may be of any appropriate construction or configuration, including but not limited to a nail, screw, staple, or other appropriate fastening element configured with a penetrative portion configured to penetrate into the support surface, and a head, crown, or similar flanged portion, which may engage the fastener receiving body.

In some embodiments, the fastener receiving body 20 may have a substantially planar configuration. As shown, in an embodiment the fastener receiving body 20 includes a fastener receiving side 30, and a support surface engaging side 40. It may be appreciated that in some embodiments the fastener receiving body 20 may be generally formed of a material configured to be penetrated by a fastener, so that penetration of the fastener through the fastener receiving body 20 into the support surface may secure the fastener assisted hanger 10 to the support surface. Specifically, the penetrating portion of the fastener may be received in the fastener receiving side 30 before extending out of the support surface engaging side 40 and into the support surface, while the head, crown, or similar flanged portion engages the fastener receiving side 30 surrounding the site of the penetration.

In other embodiments, the fastener receiving body 20 may include one or more apertures therein configured to receive the fastener. It may be appreciated that an engaging portion of the fastener may extend through one of the one or more apertures in the fastener receiving body 20 into the support surface, wherein the head, crown, or similar flanged portion of the fastener engages the fastener receiving side 30 of the fastener receiving body 20 outside of the one or more apertures, to secure the fastener assisted hanger 10 to the support surface.

Adjacent to the fastener receiving body 20 is a hook portion 50 configured to receive a retainable object, so as to couple the retainable object to the support surface when the fastener assisted hanger 10 is secured to the support surface. It may be appreciated that the hook portion 50 may be considered a hook, a clip, or any other retaining structure. Additionally, the retainable object may be any appropriate body. For example, in some embodiments, the retainable object may be elongate, such as but not limited to a cable, wire, string, cord, or rope. In some such embodiments, the retainable object may even be plant life, such as but not limited to vines. In other embodiments, the retainable object may be any other appropriate hookable body, including fabrics (i.e. clothing or towels), pictures or paintings. It may be appreciated that the hook portion 50 may vary in construction in some embodiments, to generally be of a suitable strength to retain a desired retainable object. For example, where the hook portion 50 is configured generally for retaining wires or cables, it need not be as strong as an embodiment where the hook portion 50 is configured to function as a coat hook or otherwise support a greater load.

In an embodiment, the hook portion 50 includes a shank 60 configured to extend away from the fastener receiving body 20. In the illustrated embodiment, the shank 60 includes a pair of shank arms 60a and 60b extending from a body contacting portion 60c to a hook contacting portion 60d. In some embodiments, such as that illustrated, the shank 60 may be configured to extend generally along the support surface (i.e., may generally be coplanar with the fastener receiving body 20). In an embodiment, the center of the shank 60, bounded by the shank arms 60a and 60b, the body contacting portion 60c and the hook contacting portion 60d, is an aperture 70 extending through the shank 60. It may be appreciated that the aperture 70 may facilitate easier access to objects received in the hook portion 50 (such as where the fastener receiving body 20 is secured at a corner of the support surface, where the hook portion 50 extends outward from the corner) by allowing access to the retainable object from a back side of the hook portion 50. In some embodiments, the aperture 70 may aid in retention of the receivable object by the hook portion 50, as described in greater detail below.

Extending from the hook contacting portion 60d of the shank 60 may be a bend 80 configured to extend generally away from the shank 60 (and the support surface). As described in greater detail below, in some embodiments the bend 80 may be relatively flexible, or may be pivotally coupled to the shank 60. In other embodiments, the bend 80 may be rigid. Extending from the bend 80 is an arm 90. In some embodiments, the arm 90 may be relatively flexible, or may be pivotally coupled to the bend 80. In other embodiments, the arm 90 may be rigid. It may be appreciated that flexibility or a pivotal coupling of either or both of the bend 80 and the arm 90 may facilitate slight deformation of the hook portion 50, to facilitate expanding a retaining space 100 between the arm 90 and the shank 60, which may allow for retention of a larger retainable object. As shown, in an embodiment the hook portion 50 may include a retaining flange 110 extending into an opening of the retaining space 100. In the illustrated embodiment, the retaining flange 110 extends from a free end of the arm 90 (distal from the bend 80) towards the shank 60. In some such embodiments, the retaining flange 110, the arm 90, the bend 80 and the shank 60 may generally encircle the retaining space 100 such that a retainable object extending therethrough may be secured to the support surface. In embodiments containing the retaining flange 110, it may be appreciated that a flexibility or pivotal coupling of the bend 80 and the arm 90 may increase a spacing between the retaining flange 110 and the shank 60, so as to facilitate insertion of the retainable object into the retaining space 100. In some embodiments containing the aperture 70, the retaining flange 110 may extend into the aperture 70, which may completely encircle the retaining space 100. In other embodiments, a groove may be formed on the shank 60 which may be engaged by a tip of the retaining flange 110 to selectively close the opening of the retaining space 100. In still other embodiments, the retaining flange 110 may be sufficiently long to generally contact the shank 60, so as to selectively close the opening of the retaining space 100.

In some embodiments, the shank 60 may be configured to bend or otherwise pivot with respect to the fastener receiving body 20. It may be appreciated that in some embodiments such bending or pivoting may facilitate easier grasping of the hook portion 50 by a user, by allowing the user to lift the hook portion 50 away from the support surface when inserting a retainable object into the retaining space 100, after the fastener assisted hanger 10 has been secured to the support surface. In some embodiments, the material coupling the shank 60 to the fastener receiving body 20 may be configured to remain in a deformed shape, while in other embodiments, the material may return to its original configuration. In the illustrated embodiment, a grooved portion 120 connects the shank 60 to the fastener receiving body 20. As shown in the top view of FIG. 2A, this material may be thinner than that of the shank 60 and the fastener receiving body 30, so as to facilitate bending or pivoting of the shank 60 relative to the fastener receiving body 20 at the site of the grooved portion 120. For example, in an embodiment the grooved portion 120 may be configured to allow the fastener assisted hanger 10 to be bent approximately 90 degrees (e.g., where the fastener receiving body 20 remains stationary while the shank 60 moves relative thereto). Such movement may be useful, for example, when the fastener assisted hanger 10 is used overhead to attach holiday lights to the soffit of a house, which may allow the hook portion 50 to bend to position the holiday lights away from the soffit to allow better visibility thereof.

It may be appreciated that the fastener assisted hanger 10 may be configured to align a fastener tool relative to the fastener receiving body 20, so as to ensure proper placement of a fastener into the fastener receiving body 20 when mounting the fastener assisted hanger 10 to a support surface. In particular, it may be appreciated that the fastener assisted hanger 10 may include a pair of datum surfaces formed therein, configured to orient the fastener tool relative to the fastener receiving body 20. In the illustrated embodiment, a first datum surface 130 is formed on the hook portion 50. In particular, in the illustrated embodiment the first datum surface 130 is formed at the tip of the free end of the arm 90. In other embodiments, a separate datum surface may be formed on or surrounding the fastener receiving side 30 of the fastener receiving body 20. Additionally, while in the illustrated embodiment the hook portion 50 opens towards the fastener receiving body 20, such that the first datum surface 130 is formed proximal to the opening of the hook portion 50, in other embodiments where the hook portion 50 opens away from the fastener receiving body 20, the first datum surface 130 may be formed on the bend 80, or on a portion of the arm 90 proximal to the bend 80. It may be appreciated that when positioning the fastener tool against the fastener receiving side 30 of the fastener receiving body 20, by abutting the fastener tool to the first datum surface 130, the fastener tool may be oriented in a first direction relative to the fastener receiving body 20.

As shown, a second datum surface 140 is also formed on the fastener assisted hanger 10. In the illustrated embodiment, the second datum surface 140 is formed on a datum flange 150 that extends from the fastener receiving side 30 of the fastener receiving body 20. While in the illustrated embodiment the datum flange 150 extends perpendicular to the fastener receiving side 130, in other embodiments, the datum flange 150 may extend at an angle, wherein the second datum surface 140 may be formed at an edge thereof bordering a portion of the fastener receiving side 30 of the fastener receiving body 20. When positioning the fastener tool against the fastener receiving side 30 of the fastener receiving body 20, by abutting the fastener tool to the second datum surface 130, the fastener tool may be oriented in a second direction relative to the fastener receiving body 20. It may therefore be appreciated that by abutting the fastener tool against both the first datum surface 130 and the second datum surface 140, the fastener tool may be positioned relative to the fastener receiving body 20 so that when operating the fastener tool, the fastener tool places a fastener within a bounded area of the fastener receiving body 20, oriented in both the first orientation direction and the second orientation direction.

In the illustrated embodiment, each of the first datum surface 130 and the second datum surface 140 are located on larger surfaces configured to be abutted against by the fastener tool. In some embodiments the first datum surface 130 and the second datum surface 140 may be formed at the meetings of surfaces (i.e. at a convergence point, or a corner of multiple surfaces). Accordingly, it may be appreciated that any surface, point, intersection of surfaces, portion of a curve defining a tangent, or any other portion of a body configured to engage with the fastener tool to align the fastener tool relative to the fastener receiving side 30 of the fastener receiving body 20 may be considered the first datum surface 130, the second datum surface 140, or an additional datum surface.

Figures 2A, 2B, 2C, 2D:
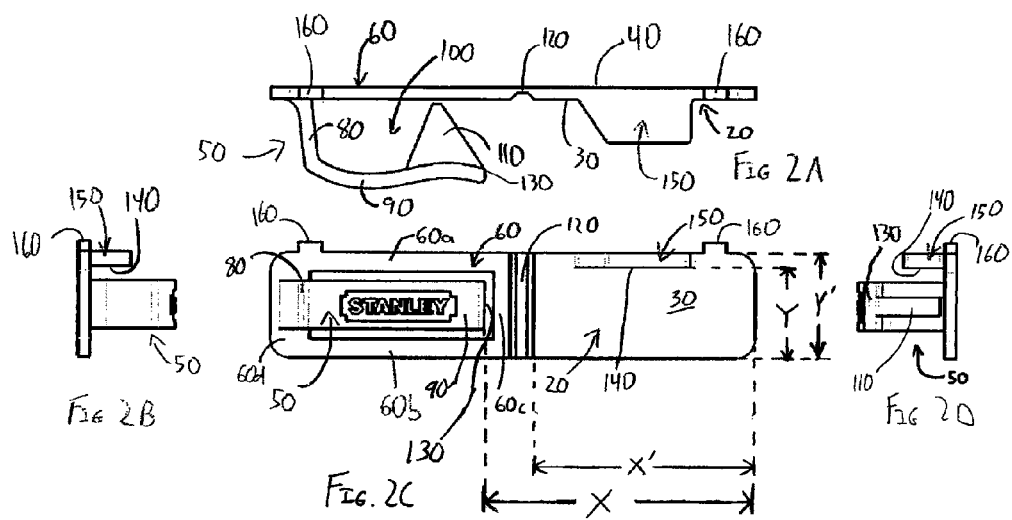
FIGS. 2A-D show plan views of the fastener assisted hanger from a top, front, and left and right sides thereof.

It may be appreciated that dimensions of the fastener receiving body 20 may be sized relative to the first datum surface 130 and the second datum surface 140, so as to provide an ample receiving space on the fastener receiving body 20 for a fastener to be applied therethrough. For example, as illustrated in the view of FIG. 2C, a dimension X associated with the fastener receiving body 20 and the first datum surface 130 may be measured across the fastener receiving side 30 from the first datum surface 130 to a far end of the fastener receiving body 20. In some non-limiting embodiments, the dimension X may be approximately greater than 10 millimeters. In various embodiments, the first datum surface 130 formed on the hook portion 50 may overhang the shank 60, the grooved portion 120 or the fastener receiving body 20. Accordingly, in some embodiments a corresponding dimension X' of the fastener receiving body 20 may extend across the fastener receiving body 20 from the far end to the grooved portion 120. In the illustrated embodiment, where the first datum surface 130 overhangs the shank 60, the dimension X' is appreciably smaller than the dimension X, and in some non-limiting embodiments may be approximately greater than 5 millimeters. Additionally, in some embodiments a dimension Y associated with the fastener receiving body 20 and the second datum surface 140, and may be measured across the fastener receiving side 30 from the second datum surface 140 to an associated far side of the fastener receiving body 20. In some non-limiting embodiments, the dimension Y may be approximately greater than 2.5 millimeters. In the illustrated embodiment, where the second datum surface 140 is formed on the datum flange 150 extending from the fastener receiving body 20, the dimension Y may be smaller than an overall associated dimension Y' of the fastener receiving body 20, which may include part of the fastener receiving body 20 on both sides of the second datum surface 140. For example, in some non-limiting embodiments the dimension Y' may be approximately greater than 3 millimeters.

In some embodiments, the fastener receiving body 20 may be generally elongated, or may otherwise be of a shape associated with receiving a fastener in a particular orientation. In such embodiments, it may be appreciated that the dimension X may be longer than the dimension Y, or vice versa. For example, where a fastener applied by the fastener tool is itself elongated in configuration, the fastener assisted hanger 10 may be configured to receive the fastener tool in a predetermined orientation relative to the fastener receiving body 20. For example, where the fastener is a staple, and the fastener tool is a stapler, the fastener receiving body 20 may be sufficiently long in the dimension X and the dimension Y so that when a portion of the stapler is aligned with the first datum surface 130 and the second datum surface 140 in a predetermined orientation, the staple may be applied by the stapler so that the elongated crown of the staple is within the elongated bounded area of the fastener receiving body 20.

In such an example, where the fastener tool is a stapler, the first datum surface 130 may be configured to engage a long side of the staple carrier, while the second datum surface 140 may be configured to engage a front of the staple carrier. A hammer of the stapler may generally be positioned relative to the staple carrier to apply a staple from the staple carrier at a position approximately 1 to 15 millimeters inset from the front of the staple carrier (i.e. within the dimension Y), with the crown of the staple being placed approximately parallel to the front of the staple carrier, and with a closer one of the legs of the staple being placed at a position approximately 1 to 20 millimeters inset from the long side of the staple carrier (i.e. within the dimension X', where the first datum surface 130 is positioned outside the fastener receiving body 20). With a standard length of the crown being approximately 10 to 12 millimeters, the fastener receiving body 20 may therefore be at least 1 millimeter by 10 millimeters in size (in the dimensions X' and Y), so as to accommodate both legs of the staple extending therethrough, while the fastener receiving body 20 in the dimension X may be approximately greater than 10 millimeters so as to position the staple within the fastener receiving body 20 while accounting for an offset between where the hammer of the stapler places the staple, and the thickness of the staple carrier in the dimension X.

Although in some embodiments the fastener receiving body 20 may be only sufficiently long to receive the fastener within the bounded area of the fastener receiving body 20 when the fastener tool is in a particular orientation, in other embodiments the fastener receiving body 20 may be sufficiently long multiple dimensions so as to receive the fastener within the bounded area of the fastener receiving body 20 across multiple orientations of the fastener tool. For example, in an embodiment, both the dimension X and the dimension Y may be sufficiently great to facilitate placement of the entirety of the fastener within the bounds of the fastener receiving body 20. In some embodiments, the dimension X and the dimension Y may be equal to one another. In another embodiment, such as, in the specific example above, the fastener receiving body 20 may be at least 25 millimeters by 25 millimeters (in the X dimension and the Y dimension), so as to accommodate both legs of the staple extending therethrough regardless of whether the front of the staple carrier is abutting the first datum surface 130 or the second datum surface 140.

Figure 3:
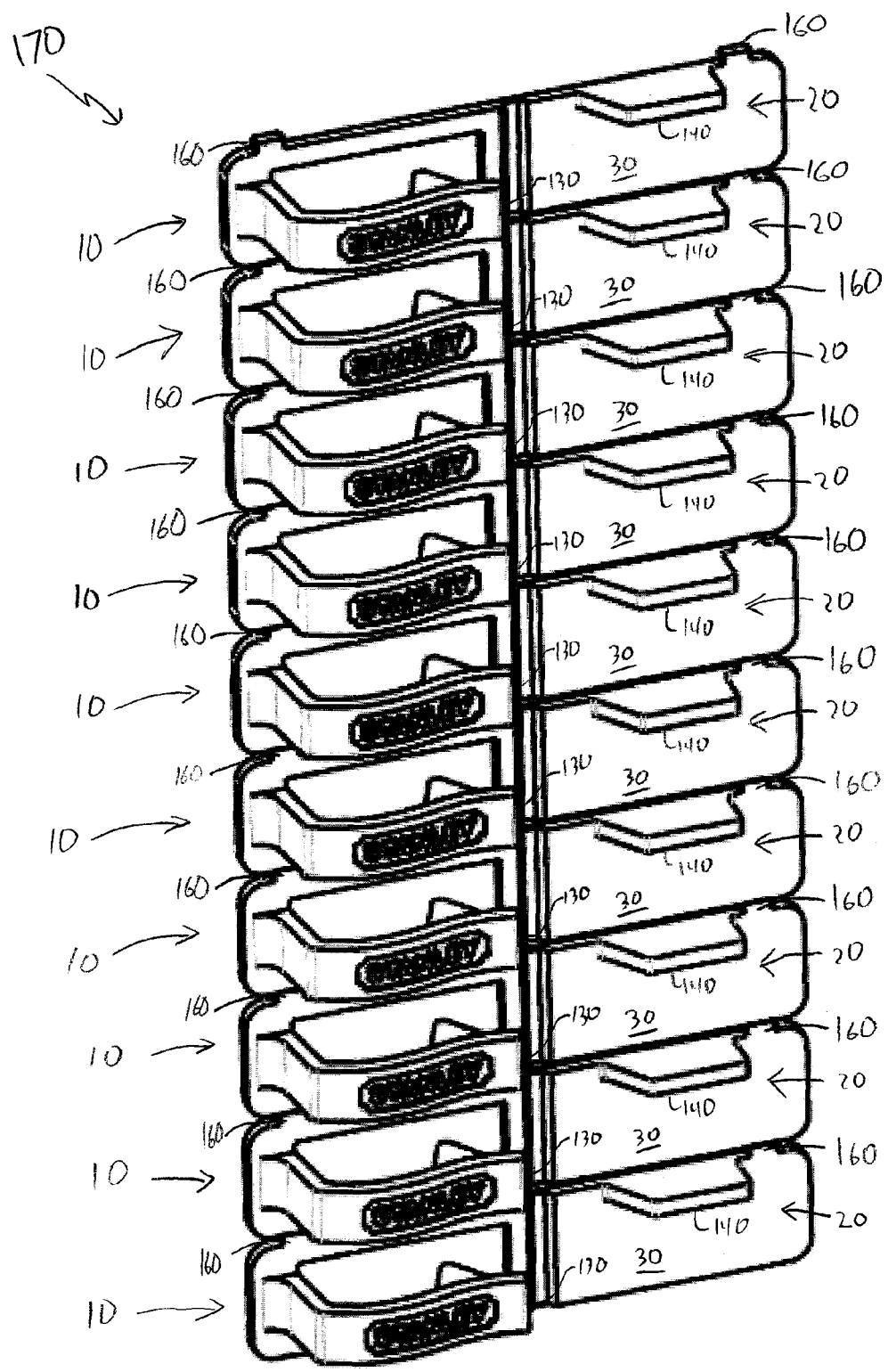
FIG. 3 shows a strip of the fastener assisted hangers of FIG. 1, coupled together in a manner configured to facilitate detachment of unused hangers after fastening of one of the hangers by the fastener.

Further shown in the illustrated embodiment of the fastener assisted hanger 10 of FIGS. 1 and 2A-D are attachment tabs 160. Although the illustrated embodiment shows a pair of attachment tabs 160, extending from the fastener receiving body 20 and the shank 60 respectively, in other embodiments, a single attachment tab 160 may be provided, or additional attachment tabs 160 may be provided. As illustrated in FIG. 3, the attachment tabs 160 may be configured to be coupled to additional fastener assisted hangers 10, such that a strip 170 of the fastener assisted hangers 10 are assembled. In some embodiments, the set of fastener assisted hangers 10 may be formed together as the strip 170, while, in other embodiments, each of the fastener assisted hangers 10 may be separately formed, then coupled together into the strip 170. In some embodiments, a plurality of the attachment tabs 160 between two adjacent fastener assisted hangers 10 may be considered a perforation between the two fastener assisted hangers 10 in the strip 170.

As shown in the illustrated embodiment, in some embodiments the first datum surface 130 and the second datum surface 140 may be positioned around the fastener receiving side 30 of the fastener receiving body 20 so that the fastener tool may engage the first datum surface 130 and the second datum surface 140 one of the fastener assisted hangers 10, without being obstructed by other fastener assisted hangers 10. For example, in the illustrated embodiment, the strip 170 is configured such that a fastener tool may align with the first datum surface 130 and the second datum surface 140 of a bottom one of the fastener assisted hangers 10, without the engagement being obstructed by the other fastener assisted hangers 10 of the strip 170. While in the illustrated embodiment the attachment tabs 160 of the top fastener assisted hanger 10 are shown as disconnected, in some embodiments the top fastener assisted hanger 10 may be coupled to marketing, promotional, or packaging material. It may be appreciated that in some such embodiments the marketing, promotional, or packaging material may be configured for display in a store, and may contain a hook or aperture therein for display on a store display rack or pegboard.

Figure 6:
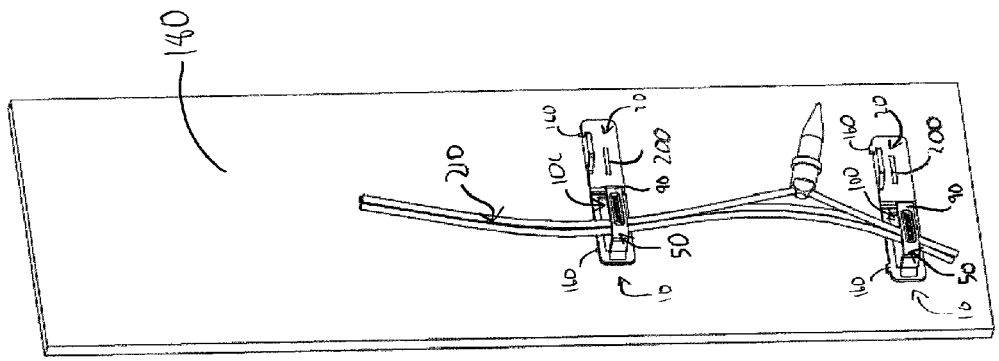
FIG. 6 shows the perspective view of the support surface of FIG. 5, after elongate members have been secured by the fastener assisted hangers.
Figure 5:
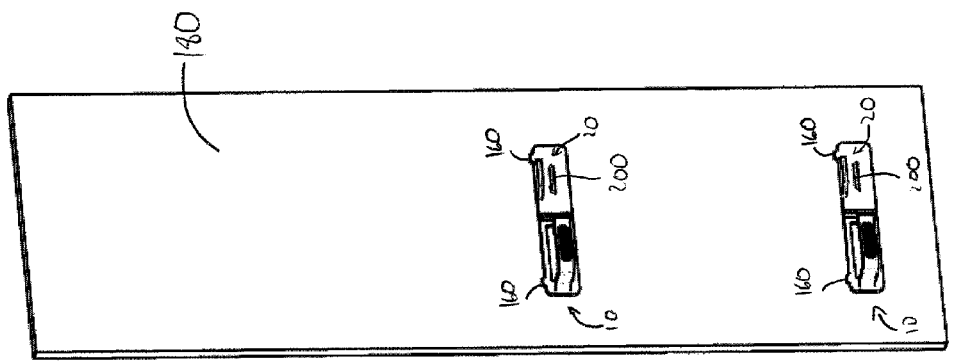
FIG. 5 shows a perspective view of the support surface after a pair of the fastener assisted hangers have been fastened thereto.
Figure 4:
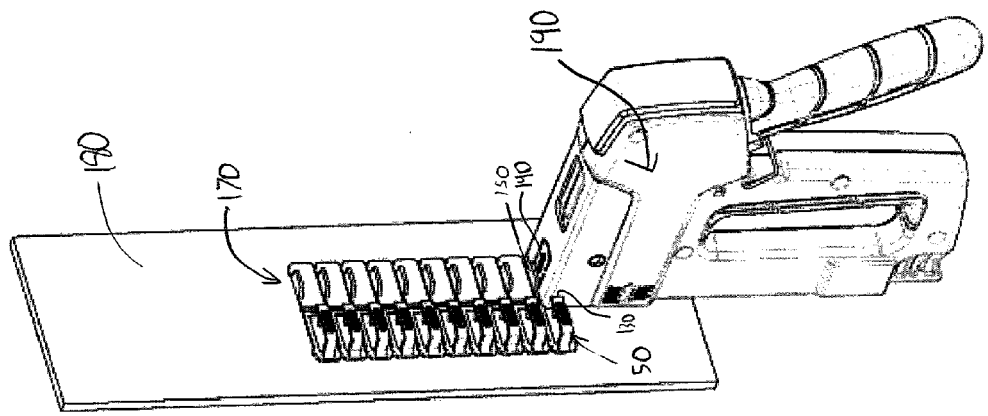
FIG. 4 shows a perspective view of the strip of fastener assisted hangers of FIG. 3, with one of the fastener assisted hangers positioned to fastened to a support surface.

FIGS. 4-6 illustrate use of the fastener assisted hangers 10. As shown in FIG. 4, where the fastener assisted hangers 10 are part of the strip 170, installing one of the fastener assisted hangers 10 includes positioning the strip 170 such that an active one of the fastener assisted hangers 10 is at a desired location on the support surface 180. As shown, the active fastener assisted hanger 10 of the illustrated embodiment of the strip 170 may be the bottom most fastener assisted hanger 10. It may be appreciated that positioning the active fastener assisted hanger 10 may include placing the active fastener receiving body 20 (obscured for the active fastener assisted hanger 10) on the support surface 180, so that the hook portion 50 of the active fastener assisted hanger 10 is at a desired location. It may be appreciated that a fastener tool 190 may then be aligned with the active fastener assisted hanger 10, such that the fastener tool 190 is aligned with the first datum surface 130 and the second datum surface 140. In some embodiments, a user of the fastener assisted hanger 10 may hold onto the hook portion 50 when aligning the fastener tool 190 with the first datum surface 130 and the second datum surface 140. In other embodiments, the user of the fastener assisted hanger 10 may hold onto other portions of the fastener assisted hanger 10 or the strip 170.

In some embodiments, either or both of the first datum surface 130 and the second datum surface 140 may be configured to retainably engage the fastener tool 190, so that the active fastener assisted hanger 10 (and where present, the strip 190) may be supported by the fastener tool 190. As an example, in some embodiments the datum flange 150 may be configured to be received in a recess of the fastener tool 190, and thus would move relative to the support surface 180 with movement of the fastener tool 190. It may be appreciated that the fastener assisted hanger 10 may be configured to engage with a plurality of fastener tools 190. While in the illustrated embodiment the fastener tool 190 is a stapler (and more particularly, a staple gun), in other embodiments, the fastener assisted hanger 10 may be configured to operate with other fastener tools 190. For example, the fastener tool 190 may comprise a nail gun or other tool having a fixed body portion or body portions that may be engaged by the first datum surface 130 and the second datum surface 140, so as to position a fastener installed therewith within the fastener receiving body 20.

Once the fastener assisted hanger 10 is positioned on the support surface 180, and the fastener tool 190 is aligned with the first datum surface 130 and the second datum surface 140, installing the fastener assisted hanger 10 may proceed by operating the fastener tool 190. As shown in FIG. 5, operating the fastener tool 190 when the fastener tool 190 is aligned with the first datum surface 130 and the second datum surface 140 may place a fastener 200 within a bounded area of the fastener receiving body 20, oriented in the first orientation direction and the second orientation direction of the fastener receiving body 20. Where the fastener assisted hanger 10 is part of the strip 170, once the fastener 200 has secured the fastener assisted hanger 10 to the support surface 180, the remainder of the strip 170 may be pulled away, detaching the secured fastener assisted hanger 10 at the attachment tabs 160.

In some embodiments where the fastener assisted hangers 10 are distributed as part of the strip 170, the attachment tabs 160 may be secured to one another with sufficient strength that they might not be easily detachable unless the fastener 200 is securing the fastener assisted hanger 10 to the support surface 180. In some such embodiments, a longer leverage arm of the strip 170 (potentially including the marketing, promotional, or packaging material) may be sufficient to break the connection at the attachment tabs 160 when the active fastener assisted hanger 10 is strongly secured to the support surface 180. In other embodiments, the fastener assisted hangers 10 may be readily detached from the strip 170 prior to installation of a selected fastener assisted hanger 10. In still other embodiments, the fastener assisted hangers 10 may be distributed separated from one another, and may be individually installed.

As shown in FIG. 6, once the fastener assisted hanger 10 is secured to the support surface 180 by the fastener 200, a retainable object 210 may be received within the retaining space 100 defined by the hook portion 50. As indicated above, receiving the retainable object 210 in the hook portion 50 of the fastener assisted hanger 10 may comprise the user opening the retaining space 100 by pulling on the arm 90 to allow the retaining object 210 to be received into the retaining space 100. Such flexibility of the hook portion 50 may be particularly useful where the hook portion 50 includes a retaining flange 110 extending towards the support surface 180.

Where there are multiple fastener assisted hangers 10 installed on the support surface 180, the retainable object 210 may be supported by each of the plurality of fastener assisted hangers 10. For example, in FIG. 6, the retainable object 210 is a wired light, and the pair of illustrated fastener assisted hangers 10 support the wires of the wired light so as to position the light bulb at a desired location on the support surface 180 therebetween. It may be appreciated, however, that in some embodiments, a single retainable object 210 may be secured by multiple fastener assisted hangers 10 across multiple support surfaces 180.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A hanger configured to be mounted to a support surface by a staple ejected by a stapler, the hanger comprising:
    a staple receiving body configured to be positioned on the support surface, the staple receiving body having a staple receiving surface configured to be pierced by the staple when ejected by the stapler;
    a hook portion positioned adjacent to the staple receiving body and configured to receive a retainable object therein; and
    datum surfaces associated with the staple receiving body;
    wherein the datum surfaces are positioned relative to the staple receiving surface such that when the stapler abuts the datum surfaces, the stapler is oriented in at least two directions relative to the staple receiving surface such that the staple ejected by the stapler pierces the staple receiving surface within a bounded area of the staple receiving body.

2. The hanger of claim 1, wherein the one of the datum surfaces is formed on the hook portion.

3. The hanger of claim 2, wherein the hook portion opens towards the staple receiving body.

4. A hanger configured to be mounted to a supporting surface, the hanger comprising:
    a fastener receiving body configured to be positioned on the supporting surface;
    a hook portion positioned adjacent to the fastener receiving body and configured to receive a retainable object therein;
    a first datum surface associated with a first orientation direction of the fastener body; and
    a second datum surface associated with a second orientation direction of the fastener body;
    wherein the relative positions of the first datum surface and the second datum surface are arranged such that when a fastener tool abuts the first datum surface and the second datum surface, a fastener applied by the fastener tool is positioned within a bounded area of the fastener receiving body; and
    wherein the hook portion comprises a retaining flange extending into an opening of the hook portion, towards the supporting surface.

5. The hanger of claim 1, wherein the hook portion comprises a shank configured to extend generally along the support surface, a bend configured to extend generally away from the support surface, and an arm configured to extend from the bend, spaced from the shank, forming a retaining space therebetween.

6. The hanger of claim 1, wherein the shank is configured to selectively bend relative to the support surface.

7. A hanger configured to be mounted to a supporting surface, the hanger comprising:
    a fastener receiving body configured to be positioned on the supporting surface;
    a hook portion positioned adjacent to the fastener receiving body and configured to receive a retainable object therein;
    a first datum surface associated with a first orientation direction of the fastener body;
    a second datum surface associated with a second orientation direction of the fastener body; and
    a grooved region between the shank and the fastener receiving body, the grooved region configured to serve as a pivot for a selective bend of the shank relative to the support surface;
    wherein the relative positions of the first datum surface and the second datum surface are arranged such that when a fastener tool abuts the first datum surface and the second datum surface, a fastener applied by the fastener tool is positioned within a bounded area of the fastener receiving body.

8. The hanger of claim 1, further comprising an attachment tab configured to be coupled to a second hanger, wherein the hanger is configured to be detached from the second hanger when securing the hanger to the support surface.

9. An assembly comprising a plurality of the hangers of claim 1, the plurality of hangers coupled together by attachment tabs formed on each of the plurality of hangers.

10. The hanger of claim 1, wherein at least one datum surface is formed on a datum flange extending perpendicular to the staple receiving body.

11. The hanger of claim 1, wherein the staple receiving body and the hook portion are integrally molded to one another.

12. The hanger of claim 1, wherein the hanger is formed from one or more of plastic, metal, paper, and rubber.

13. The hanger of claim 1, wherein the staple receiving body is configured to receive the stapler in a predetermined orientation.

14. The hanger of claim 13, wherein the staple receiving body is elongated.

15. The hanger of claim 1, wherein a dimension from one of the datum surfaces to an opposite associated end of the staple receiving body is approximately greater than 5 millimeters.

* * * * *